United States Patent [19]

Tanaka et al.

[11] 4,236,467
[45] Dec. 2, 1980

[54] SEWING MACHINE WITH DISPLAY UNITS WHICH DISPLAY GUIDANCE DATA GUIDING THE USER IN MANUAL ADJUSTMENT OF OPERATING VARIABLES IN AUTOMATIC RESPONSE TO USER SELECTION OF STITCH TYPE

[75] Inventors: Yoshikazu Tanaka, Hachioji; Yasukata Eguchi, Kunitachi, both of Japan

[73] Assignee: Janome Sewing Machine Co. Ltd., Tokyo, Japan

[21] Appl. No.: 903,176

[22] Filed: May 5, 1978

[30] Foreign Application Priority Data

May 6, 1977 [JP] Japan .................................. 52-51817
May 25, 1977 [JP] Japan .................................. 52-59840

[51] Int. Cl.² .......................................... D05B 3/02
[52] U.S. Cl. ........................... 112/158 F; 112/158 F
[58] Field of Search ........... 112/158 F, 158 E, 121.11, 112/121.12, 275, 277, 254

[56] References Cited

U.S. PATENT DOCUMENTS

| | | | |
|---|---|---|---|
| 4,055,131 | 10/1977 | O'Brien et al. | 112/158 E |
| 4,079,683 | 3/1978 | Hanyu et al. | 112/158 F |
| 4,092,937 | 6/1978 | Landau et al. | 112/121.11 |
| 4,166,423 | 9/1979 | Brienza et al. | 112/158 E X |

Primary Examiner—Peter P. Nerbun
Attorney, Agent, or Firm—Michael J. Striker

[57] ABSTRACT

The user presses a stitch-type selector button in a first row of buttons, and plural illuminatable buttons in a second row of buttons light up to indicate which application patterns are based upon the selected stitch type, as a substitute for reference to an operator's manual. The user then presses one of the illuminated second-row buttons, to effect pattern selection. Upon pattern selection a set of display units and display elements becomes operative. These display numerical ranges of cloth-feed amount and zig-zag amplitude from which the user chooses, and then manually sets on the machine. Other variables thusly displayed for user guidance are what particular attachments should be used, what thread tension should be used, what presser foot, whether a single or twin needle is to be used, and others. Depending upon the selected pattern some variables may require automatic, not manual adjustment, and the affected display units indicate this to the user. For some variables, manual-auto switches are provided, and when the selected pattern permits manual adjustment of one of these variables, the user has the option to flip the manual-auto switch to auto, to permit automatic selection of the value of such variables anyway.

7 Claims, 7 Drawing Figures

FIG_1

FIG_3-B

FIG_4

FIG_5

- A : STRAIGHT
- B : ZIGZAG
- C : OVEREDGE
- D : FASTENER
- E : THREE FOLDED STITCH
- F : PINTUCK
- G : BUTTON SEWING
- H : BASTING
- I : CHAIN
- J : UPPER THREAD TENSION
- K : BASIC POSITION
- L : FEED
- M : AMPLITUDE
- N : FOOT
- O : NEEDLE

FIG_6

SEWING MACHINE WITH DISPLAY UNITS WHICH DISPLAY GUIDANCE DATA GUIDING THE USER IN MANUAL ADJUSTMENT OF OPERATING VARIABLES IN AUTOMATIC RESPONSE TO USER SELECTION OF STITCH TYPE

BRIEF DESCRIPTION OF THE INVENTION

A sewing machine of the invention is designed, with a slight touch of a specific pattern switch, to automatically operate to select the corresponding cam or the corresponding memorized stitch control data and to automatically adjust the zigzag amplitude, the feed amount, the pressure of the presser bar, etc. in response to the selected pattern, and also to indicate information concerning the adjustments which are to be manually performed, for example, exchange of the presser foot, the needle, etc.

According to the prior art, the machine operator, in the stitching operation, has manually performed the necessary adjustments or exchanges of attachments of the sewing machine depending upon the selected patterns to be stitched, in accordance with her experience, memory or the instructions in an accompanying service manual. Such adjustment of the sewing machine often involves errors, and is especially time consuming.

The present invention has been provided to eliminate the defects and disadvantages of the prior art.

It is a primary object of the invention to provide a method for easily and quickly selecting a desired type of stitches and for adjusting the sewing machine in dependence upon the selected type of stitches.

It is another object of the invention to automatically adjust the zigzag amplitude, the feeding amount, etc. in dependence upon a selected type of stitches.

It is another object of the invention to indicate the necessary adjustments of the sewing machine which are to be manually performed in dependence upon a selected sort of stitches.

Other features and advantages of the invention will be apparent from the following description of the preferred embodiments of the invention in reference to the attaching drawings.

BRIEF DESCRIPTION OF THE DRAWINGS

FIG. 2 is an enlarged view of part of FIG. 1, FIGS. 3-A and 3-B are the left and right halves of a circuit diagram which depicts the machine's control circuitry

DETAILED DESCRIPTION OF THE INVENTION

The invention will be discribed with reference to the drawings.

Figure 1:
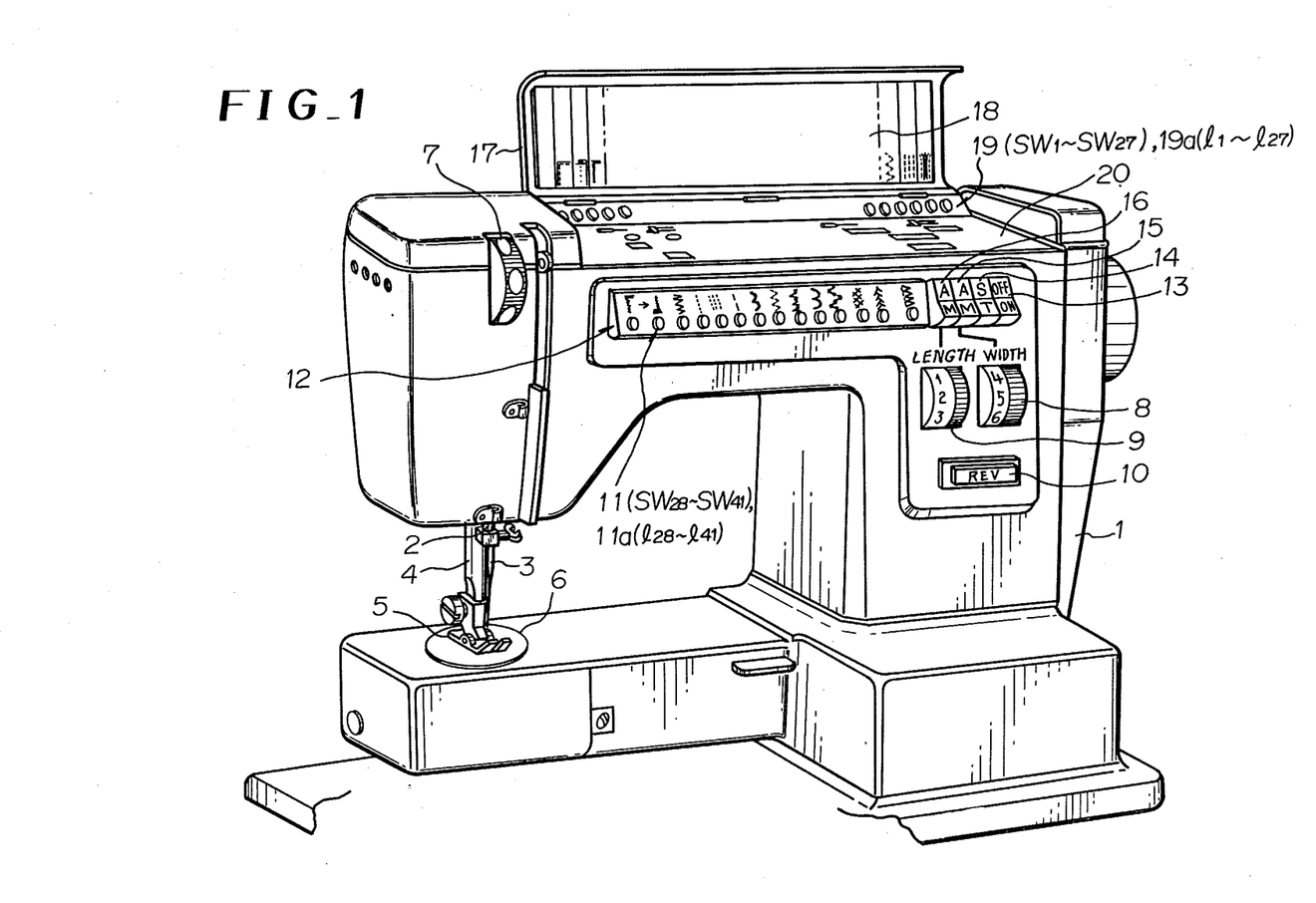
FIG. 1 is a perspective view depicting the external appearance of a sewing machine according to the invention.

In FIG. 1, the reference numeral 1 denotes the machine housing. Preference numeral 2 denote a needle bar with a needle 3 at its lower end. Reference numeral 4 denotes a presser bar with a presser foot 5 at its lower end. Numeral 6 denotes a needle plate, and 7 an upper thread tension adjusting dial. Reference numeral 8 denotes a zigzag amplitude adjusting dial. Reference numeral 9 denotes a feed amount adjusting dial. Reference numeral 10 denotes a feed reversing push button. Reference numeral 11 denotes a group of pattern selecting buttons (SW28–SW41) provided in correspondence to pattern indications 12. Reference numeral 11a denotes a group of lamps (l28–l41) each provided in correspondence to the pattern selecting buttons (SW28–SW41). Numeral 13 denotes a power source switch. Numeral 14 denotes a switch manually operated between two positions for use of either a single needle or else a twin-needle. Numerals 15 and 16 denote manual-automatic switches used to select whether the zigzag amplitude and the feeding amount are to be manually adjusted or automatically adjusted. Numeral 17 denotes a top cover movable between a closed position and an open position. Numeral 18 denotes a tabular panel provided on the inner face of the top cover and printed with the names and corresponding diagrams of the patterns which may be selectively stitched by the sewing machine. 19 (SW1 ... SW27) denotes a group of touch switches each provided in correspondence to the patterns represented on panel 18. 19a denotes a group of lamps (l1–l27) each provided in correspondence to a respective one of the touch switches 19. Numeral 20 denotes an adjustment indicating panel provided on the top of the sewing machine, viewable and accessible when the top cover 18 is opened.

Figure 2:
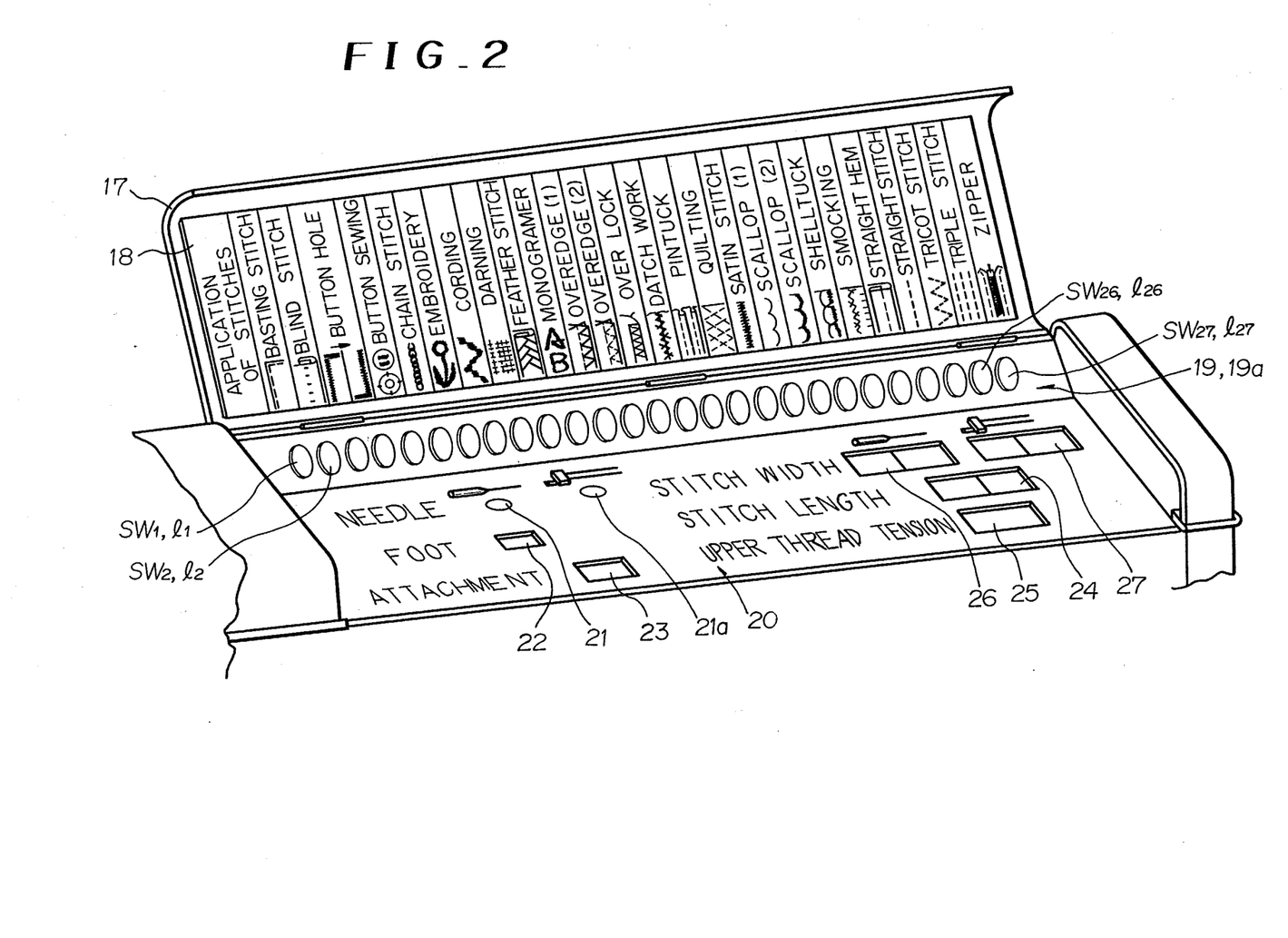

In FIGS. 2, 21 and 21a denote lamps for indicating which needle is to be used, namely a single needle or a twin-needle in accordance with the selected pattern. 22 denotes an LED or liquid crystal display for indicating by letters or symbols different presser foots to be used. 23, 24 and 25 denote display units which respectively indicate different attachments to be used, the feeding amount to be set and the thread tension to be set. 26 denotes a display unit for indicating required values of zigzag amplitude when a single needle is used, and 27 denotes a similar display unit which indicates required zigzag amplitude when a twin-needle is used.

Figure 3:
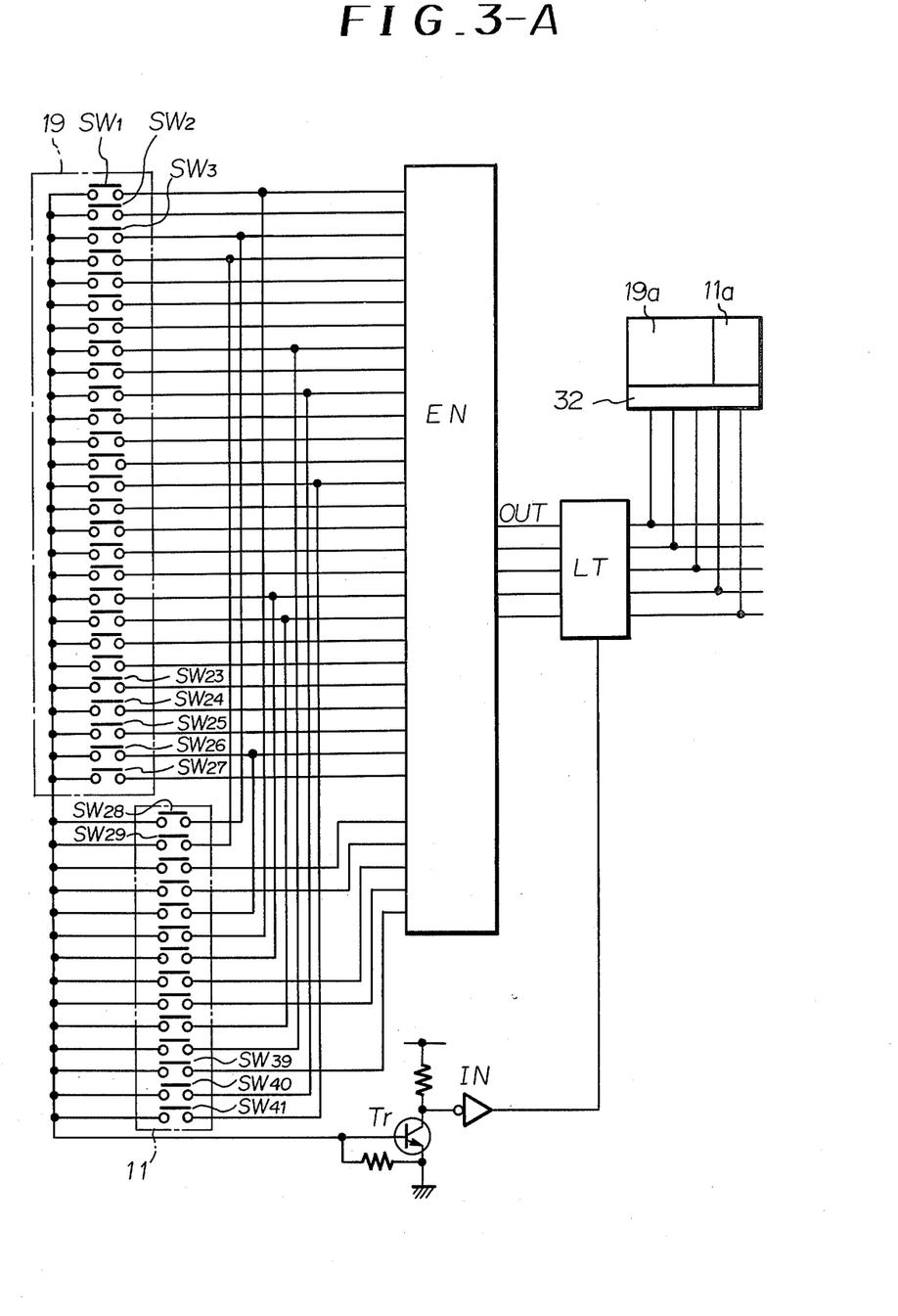
Figure 4:
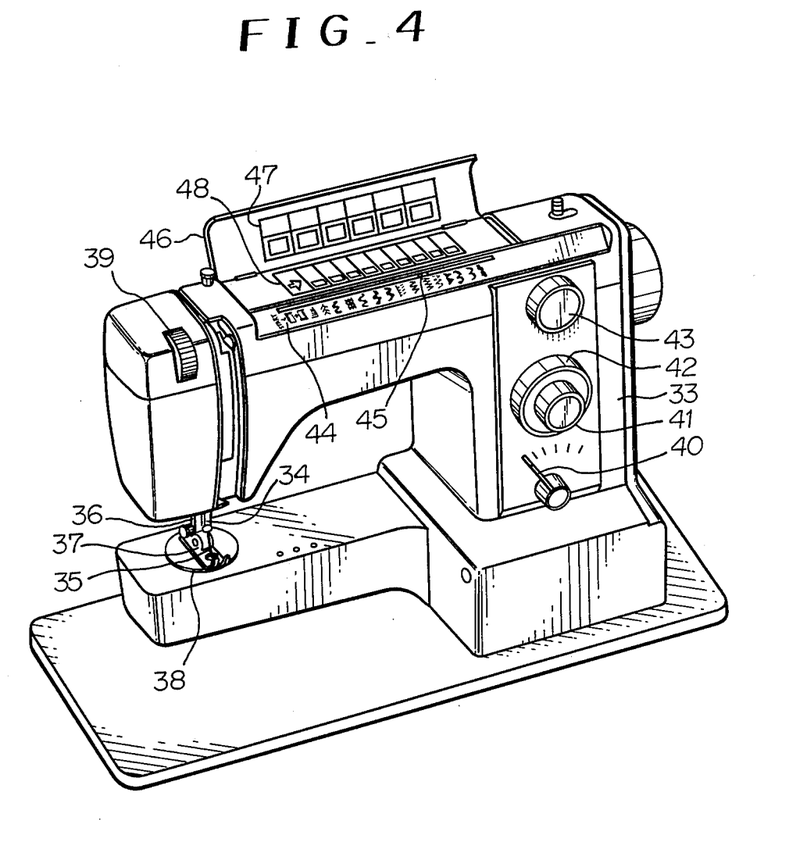
FIG. 4 depicts the external appearance of a second embodiment of the invention.
Figure 5:
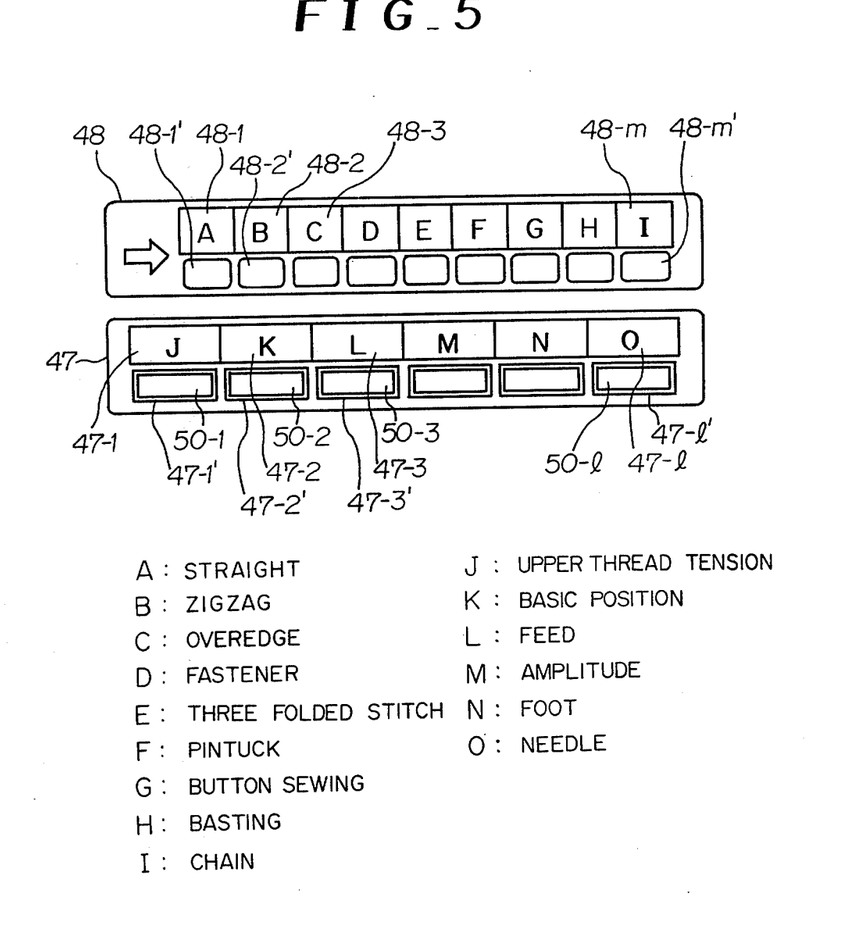
FIG. 5 is an enlarged view of part of FIG. 4.
Figure 6:
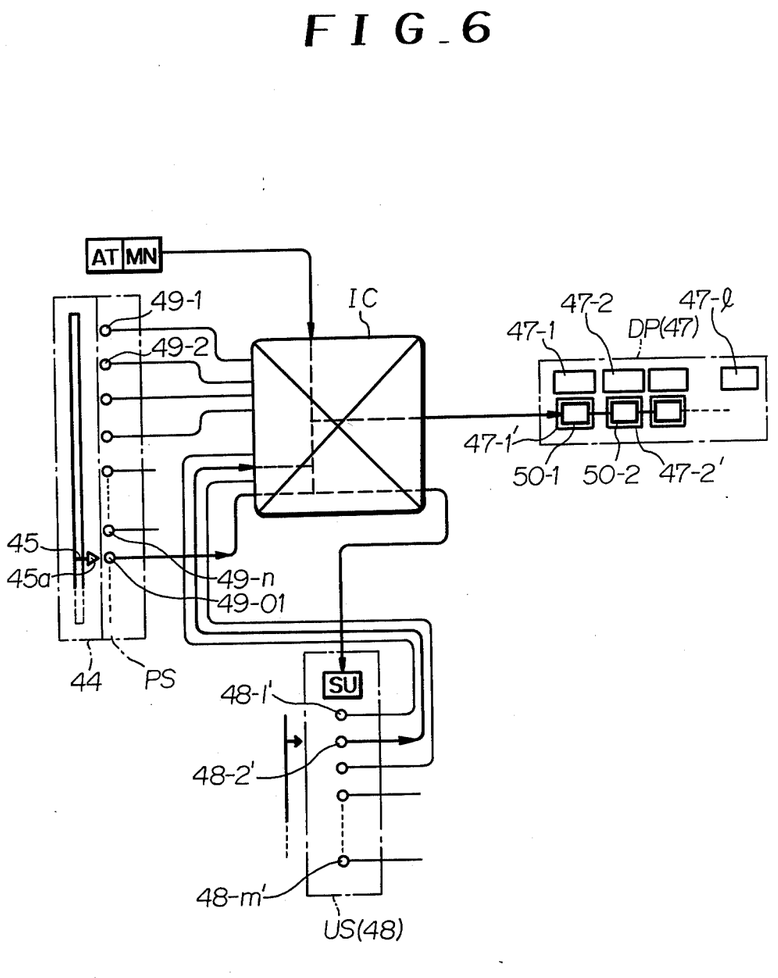
FIG. 6 depicts the control circuit of the second embodiment.

FIGS. 3-A and 3-B together depict the control circuit of the machine. 28 designates a device for selecting one of the patterns 18 in accordance with an input code signal. The selecting device 28 may mechanically select one of the pattern cams or may electrically select a set of stitch control signals from a static memory in timed relation with the rotation of the sewing machine. 29 and 30 denote devices, which are operated simultaneously with the actuation of the selecting device 28 to determine the size (zigzag amplitude and feeding amount) of a selected pattern in accordance with an input code signal if the manual-automatic switches 15, 16 are at their respective automatic settings (A). 31 denotes a device for reducing the automatically set zigzag amplitude by one half.

Of the pattern selecting switches (SW1–SW27, SW28–SW41), switches associated with the same respective pattern are directly connected to each other (actually 32 patterns) and are connected to the input terminals of an encoder (EN). The encoder has output terminals connected to the input terminals of a latch circuit (LT). The latch circuit has output terminals connected to the address input terminals of a memory (MM) and also connected to the input terminals of a control device for the indicating lamps 11a, 19a respectively associated with the patterns 12 and 18. The lamps 11a, 19a respond to 5-bit output signals from the latch circuit (LT). The left terminals of the switches (SW1) to (SW41) are connected to the base of a transistor (Tr), and when any one of the switches (SW1) to (SW41) is turned ON, electric current is supplied to the base and transistor (Tr) becomes conductive and transmits a signal via an inverter (IN) to the trigger terminal (Cp) of latch circuit (LT), (LT) being triggered at the rising flank of this signal to latch the 5-bit signal applied to the inputs of (LT) so that these be transmitted to and held at the outputs of the latch circuit.

The memory (MM) comprises 32 memory sectors corresponding to the 32 pattern selector switches, and the output terminals of the memory are connected to a number of devices as shown in FIG. 3-b. Data output terminals (D0)–(D4) represented by a single one in FIG. 3-B, of the memory (MM) are connected to the pattern generating device 29 for selecting a desired stitch pattern in accordance with a received code word (corresponding to a selection of the pattern cam). This code word also includes a condition signal for flipping the automatic-manual switches 15, 16 to their automatic settings (A) and for automatically setting the amplitude and the feeding at the time of selection of the stitch pattern. Data output terminals (D5)–(D8) are connected to the presser foot display device 22. (D9)–(D10) are connected to the attachment display unit 23. (D11)–(D12) are connected to the upper thread tension display unit 25. When any one of the stitch type selecting switches 19 is turned ON, there results a display of the presser foot and the attachments to be used, and the upper thread tension to be used.

Memory output terminals (D13)–(D16), (D17)–(D20) and (D21) are, as shown, connected to the feeding amount display unit 24 and to the automatic feed setting device 30. Output terminals (D13)–(D16) produce different ones of fifteen different 4-bit words, representing feeding amounts between 0 mm and 7 mm. Likewise, output terminals (D17)–(D20) produce different ones of fifteen 4-bit words, representing feeding amounts between 0 mm and 7 mm. Output terminals (D17)–(D20) also produce a sixteenth 4-bit word, namely 1111, which appears when manual setting of the feeding amount is impossible for the particular pattern selected. Output terminal (D21) produces an output "1" signal when manual setting of the feeding amount is possible for the particular pattern selected. If the operator selects a pattern which does not permit manual setting of the feed amount, the 4-bit word 1111 is produced on output terminals (D17)–(D20), the four "1" bits thereof being applied to the four inputs of an AND-gate AND1, which latter applies a "1" signal to the upper input of a NOR-gate NOR1. As a result, NOR1 produces an output "0" signal, which it applies to a control input of feeding amount display unit 24 and to the control input of automatic feed setting device 30. As a result, feeding amount display unit 24 does not display numerical feed values which the operator can manually set, but instead displays, for example, the word AUTO, to thereby inform the operator that, for the selected pattern, the feeding amount must be the feeding amount automatically set by automatic feed setting device 30. The "0" signal applied to automatic feed setting device 30 enables the latter for operation. (For example, device 30 may be a feed-control cam and follower associated with the selected pattern, or may be a variable-feed control device whose setting is determined by a further word produced at further outputs of the memory MM.) Because, for the selected pattern, manual selection of the feeding amount is not possible in any event, the setting of manual-auto switch 16 is irrelevant for such a pattern.

In contrast, if the selected pattern is one which permits manual setting of the feeding amount, then AND1 does not receive the input word 1111 and does not produce an output "1" signal, and accordingly, the output signal of NOR1 will be determined by the output signal from a further AND-gate AND2. Because the selected pattern is one which permits manual setting of the feeding amount, memory output terminal (D21) produces an output "1" bit, which is applied to the upper input of AND1. If, now, the manual-auto switch 16 is closed, i.e., in its illustrated manual setting (M), then a "0" signal is applied to the lower input of AND2, the latter produces an output "0" signal, and NOR1 therefore produces an output "1" signal. As a result, the automatic feed setting device 30 is disabled, whereas the feeding amount display unit 24 is enabled. The feeding amount display unit 24 then displays a numerical range of feeding amounts from which the user can manually select, i.e., by means of feed adjuster dial 9 (FIG. 1). For example, for the particular pattern involved, the 4-bit word produced on memory output terminals (D13)–(D16) may be 0001 (corresponding to 0.5 mm), and the 4-bit word produced on memory output terminals (D17)–(D20) may be 1011 (corresponding to 5.5 mm), as a result of which feeding amount display unit 24 displays a numerical range 0.5–5.5 mm, indicating to the user the range of feeding amounts which she may select when operating dial 9.

Even if the selected pattern is one which thusly permits manual setting of the feeding amount, if the operator instead wishes to let the machine select its own feeding amount, she leaves manual-auto switch 16 in its automatic setting (A), as a result of which NOR1 produces an output "0" signal, i.e., just as in the case of a pattern which does not permit manual setting of the feeding amount.

The connections for control of zig-zag amplitude are analogous to those just explained with regard to control of the cloth feeding amount. Single-needle amplitude display unit 26, when operative, displays two numerical zig-zag amplitude values, constituting a range within which the user may select and manually set a desired zig-zag amplitude value using dial 8 (FIG. 1). The two numerical values displayed by single-needle amplitude display unit 26 are respectively applied to unit 26 in the form of one 4-bit code word received from memory output terminals (D30)–(D33) and a second 4-bit code word received from memory output terminals (D34)–(D37). Similarly, the two numerical values displayed by twin-needle amplitude display unit 27 are received in the form of a 4-bit code word from memory output terminals (D22)–(D25) and a further 4-bit code word from memory output terminals (D26)–(D29). Once again, the 4-bit code word produced on memory output terminals (D34)–(D37) is 1111, when the selected pattern does not permit manual selection of the zig-zag amplitude, and the bit produced at a further memory output terminal (D38) is a "1" when the selected pattern does permit manual selection of zig-zag amplitude. The bits on output terminals (D34)–(D38) are applied to a combination of AND- and NOR-gates AND3, AND4, NOR2, whose interconnections and operation are the same as those of AND1, AND2, NOR1 described above, the output signal of NOR2 being applied to the control inputs of the single-needle and twin-needle amplitude display units 26, 27 and also to the control input of the automatic amplitude setting device 29 (which, again, may for example be comprised of a simple zig-zag control cam, or of an electromagnetic device which sets the zig-zag amplitude in dependence upon further control words received from further memory output terminals). The manual-auto switch 15 for zig-zag amplitude is connected analogously to the manual-auto switch 16 for cloth feed amount. I.e., if the selected pattern is one which does not permit manual selection of zig-zag amplitude, then the setting of switch 15 is irrelevant; if the selected pattern is one which does permit manual selection of zig-zag amplitude, then the selection is performed automatically if switch 15 is kept in its automatic setting (A), but if in its manual setting (M) then one or the other of the single-needle and twin-needle amplitude display units 26, 27 is enabled, to display a range of numerical values from which the user can select when manually setting the zig-zag amplitude.

Memory output terminal (D39) produces a "1" bit when the selected pattern is one for which the use of a twin sewing needle is possible. Memory output terminal (D40) produces a "1" bit when the selected pattern is one for which the use of a single needle is possible. These two output terminals are connected to the two needle-type indicator lamps 21, 21a (see also FIG. 2). Additionally, these two output terminals are connected to the upper inputs of respective AND-gates AND5 and AND6. The lower inputs of AND5 and AND6 are respectively connected to the S (single) and T (twin) contacts of the needle-type selector switch 14. The output of AND5 is connected to a further enablement input of twin-needle amplitude display unit 27, and the output of AND6 to a further enablement input of single-needle amplitude display unit 26. Also, the output of AND5 is connected to the control input of an amplitude-halver unit 31.

If the selected pattern is one which permits the use of a single needle, and if furthermore the user has selected a single needle by setting switch 14 ot the S setting thereof, AND6 produces an output "1" signal, which is applied to the enablement input of single-needle amplitude display unit 26. The latter will display a numerical range of amplitude values from which to manually select if, as a further condition, the selected pattern is one which permits manual setting of zig-zag amplitude; otherwise, neither of display units 26, 27 will be enabled.

If the selected pattern is one which permits the use of a twin needle, and if furthermore the user has selected a twin needle by setting switch 14 to the T setting thereof, AND5 produces an output "1" signal, which is applied to the enablement input of twin-needle amplitude display unit 27. The latter now displays a numerical range of amplitude values from which to manually select if, as a further condition, the selected pattern is one which permits manual setting of zig-zag amplitude.

If the selected pattern is one which permits the use of a twin needle, and if furthermore the user has selected a twin needle by setting switch 14 to the T setting thereof, and if furthermore the zig-zag amplitude is to be automatically set (either because the selected pattern does not permit manual setting, or else because the user has flipped manual-auto switch 15 to its manual setting), then the "1" signal which nevertheless appears at the output of AND5 (i.e., because the use of a twin needle for this pattern is possible, and the user has furthermore selected this alternative) activates the amplitude-halver unit 31, so that the automatically set zig-zag amplitude value will, furthermore, be automatically reduced by one-half.

The device of the invention operates in the following manner. When, for example, basting, the stitch type selecting switch (SW1 in this embodiment) located alongside the basting symbol on the panel 18 is pressed, a corresponding input terminal of the encoder (EN) goes to low level (L), and its five output terminals go to 0 0 0 0 0. Transistor (Tr) is supplied with base current due to activation of (SW1) and becomes conductive the output of inverter (IN) goes to high level (H) and the latch device (LT) responds to the low to high transition by latching this code 0 0 0 0 0. Lamp control unit 32 responds by lighting up the lamp (l1) of the basting switch (SW1) of illuminatable-punchbutton row 19 and also the lamp (l33) of the basting switch (SW33) of the illuminatable-pushbutton row 12. Memorized stitch control data for basting appear at the output terminals (D0)-(D40) of memory (MM). As a result, the pattern generating device 28 is ready (selection of pattern and selection of basic pattern) for generating the pattern shown alongside said lamp (33), and the display unit 22 displays an indication of presser foot suited for the basting. Since no special attachment is needed for basting, display unit 23 displays no indication, whereas display unit 25 displays the proper tension valve to be manually set for the upper thread. For basting, (D17)-(D20) produce the code word 1 1 1 1 and therefore the automatic feed setting device 30 is operated and the feed amount display unit 24 displays the word AUTO, that is, (D13)-(D16)=0 (in this case, even if the switch 16 is flipped over to its manual setting display unit 24 will remain at AUTO).

For basting, memory output terminals (D34)-(D37) likewise produce the code word 1 1 1 1 and (D22)-(D33)=0, and as a result the automatic amplitude setting device 29 is operated and single-needle. Further in this case, since (MM) memorizes that the twin-needle cannot be used (D39=0) and that the single needle can be used (D40=1), twin needle display element 21a does not light up whereas single-needle display element 21 does light up the output of (AND5) is at 0 and the twin-needle amplitude display unit 27 is inoperative, i.e., does not even display the word AUTO. Of course, the amplitude halver device 31 is also inoperative. If switch 14 is improperly flipped to its twin-needle setting, (AND6) goes to 0 and the single-needle amplitude display unit 26 becomes inoperative, setting i.e., ceases even to display the word AUTO. (For more reliable operation, the needle-type selector switch 14, instead of being manually flipped, can be directly responsive to which type of needle has been physically inserted into the machine.) If switch 14 is now flipped back to its single needle setting, the output of (AND6) goes to 1 and the display unit 26 again indicates that the amplitude is at the automatic setting (the basting operation always has zero zig-zag amplitude). Thus, if a presser foot of A type is attached to the presser bar, and if the upper thread tension is adjusted in accordance with the display on display unit 25, basting with a proper feeding pitch results upon commencement of operation of the sewing machine.

Next reference will be made to the case where the operator presses switch (SW31) in row 11 for a straight stitching pattern. A code word (1 1 1 0 0) from the encoder is applied to the lamp control unit 32 via the latch circuit (LT), and all the lamps (L6)(l9)(l17)(l23)(l24)(l27) of row 19 light up. The pattern-representing symbols or diagrams alongside the individual ones of these lighted lamps of row 19 inform the operator of which application patterns available with the sewing machine involve straight stitching, and in effect thus take the place of an operator's manual which might contain similar information. At this point of operation, although the just listed lamps in row 19 light up, no pattern selection has as yet been performed. All the output terminals (D0)-(D38) of the memory (MM) merely produce "1" signals, and all the various display units and display elements (20)-(27) remain entirely inoperative, i.e., display nothing at all. The operator, after being thusly informed of which application patterns involve straight stitching, then selects one of these application patterns by pressing one of the pushbutton switches (SW6)(SW9)(SW17)(SW23)(SW24) or (SW27). When one of these just listed switches is pressed, this then constitutes an actual pattern selection, and then, in the same general manner as explained above with respect to selection of basting operation, the various display units and display elements (21)-(27) become operative. It will be noted that when the operator, as just explained, presses straight-stitching switch (SW31) of pushbutton row 11, lamp (l25) in illuminatable-pushbutton row 19, i.e., the very lamp corresponding to simple straight stitching, is not one of the lamps which light up. The purpose of the mode of display just set forth is instructional, i.e., to inform the operator of which application patterns involve straight stitching, and if the operator is not desirous of this instructional information, and instead merely wants to select simple straight stitching as such, she does not press the straight-stitching switch (SW31) of row 11 in the first place, but instead directly presses the straight-stitching switch (SW25) of pushbutton row 19 to begin with, in the illustrated embodiment being described; of course, other variations in the manner of use would be possible.

In the illustrated embodiment, as already explained, pressing of the straight-stitching pushbutton (SW31) of row 11 does not effect actual pattern selection, but instead merely lights up illuminatable pushbuttons of row 19, one of which the operator then presses to effect actual pattern selection, and also to effect display of numerical and other guidance data which assist the operator in setting up the machine for the selected pattern. In contrast, pressing of the basting-stitch switch (SW33) of pushbutton row 11 does not initiate such an instructional display of pattern choices from which to select, but instead constitutes actual pattern selection, i.e., selection of the basting-stitch pattern. This is because the stitch control data used for the basting-stitch pattern are, in the illustrated exemplary embodiment, used for no other one of the various available patterns. Thus, when the operator wishes to effect selection of the basting-stitch pattern, she can either directly press the basting-stitch switch (SW1) in pushbutton row 19 or else can directly press the basting-stitch switch (SW33) in pushbutton row 11, with identical effect in both cases. In the illustrated embodiment, other patterns which, in manner analogous to the basting-stitch pattern, do not share their stitch-control data with any other pattern, include the scallop stitch and the overlock stitch. This will be seen from the wiring of the selector switches in FIG. 3-A. For example, the basting-stitch switches (SW1)(SW33) in FIG. 3-A will be seen to be identically connected to the input of the encoder (EN); in contrast, the straight-stitching switches (SW25)(SW31) will be seen to be differently connected to the inputs of the encoder (EN).

In the embodiment just described, the display units and display elements provided deal with a limited number of pattern variables. However, it will be understood that a greater number of display units and display elements could be involved, for the display of guidance information or AUTO indications involving further variables, such as automatic setting of the operating speed of the machine, which of several needle plates to use, adjustments of the vertical position of the cloth-engaging teeth of the cloth feeder mechanism, automatic setting of pressure, and so forth.

We claim:

1. A sewing machine comprising a machine housing, stitch forming instrumentalities provided in the machine housing for changing the relative positions of the needle and the sewn material to form stitches, stitch selector means operable by the user of the machine for indicating what type of stitches are to be produced by the stitch forming instrumentalities, manually operated adjusting means for adjusting operating variables of the sewing machine, display means operative upon receipt of control signals for effecting a visible display of guidance information informing the operator of what manual adjustments must be performed using the manually operated adjusting means, and control circuit means responding to the stitch selector means by applying to the display means control signals causing the display means to display guidance information pertaining to the selected type of stitches.

2. A sewing machine as defined in claim 1, the housing having a movable cover movable between a closed and an open position, the cover being provided with a series of stitch type diagrams accessible to view when the cover is in the open position, the stitch selector means comprising a series of stitch selector switches located to be accessible to the user when the cover is in open position, each stitch selector switch being located alongside a respective one of the stitch type diagrams.

3. A sewing machine as defined in claim 2, the display means comprising a plurality of display units which are accessible to the user's view when the cover is in open position, the display units each being operative in response to said control signals for displaying respective guidance information pertaining to a respective one of the operating variables of the sewing machine.

4. A sewing machine as defined in claim 3, the display units including a display unit which numerically displays what cloth feed amount is to be manually set for the selected type of stitches and a display unit which numerically displays what zig-zag amplitude is to be manually set for the selected type of stitches.

5. A sewing machine as defined in claim 3, the display units including a display unit which indicates to the user what type of attachment must be attached to the sewing machine to implement the selected type of stitches.

6. A sewing machine as defined in claim 3, the series of stitch selector switches being each provided with a respective lamp which lights up when the respective selector switch is operated by the user.

7. A sewing machine as defined in claim 1, the sewing machine furthermore comprising mode selection means operable by the user for selecting whether the operating variables are to be manually or automatically adjusted, the sewing machine furthermore comprising automatic adjusting means operative when the mode selection means has been operated to select automatic adjustment for automatically adjusting the operating variables of the sewing machine in dependence upon the operation of the stitch selector means.

* * * * *